(12) United States Patent
Lund

(10) Patent No.: US 9,171,359 B1
(45) Date of Patent: Oct. 27, 2015

(54) METHOD AND SYSTEM FOR AUTO-CORRECTING PERSPECTIVE DISTORTION IN DOCUMENT IMAGES

(71) Applicant: EMC Corporation, Hopkinton, MA (US)

(72) Inventor: Christopher D. Lund, San Diego, CA (US)

(73) Assignee: EMC CORPORATION, Hopkinton, MA (US)

( * ) Notice: Subject to any disclaimer, the term of this patent is extended or adjusted under 35 U.S.C. 154(b) by 94 days.

(21) Appl. No.: 14/024,433

(22) Filed: Sep. 11, 2013

(51) Int. Cl.
*G06K 9/00* (2006.01)
*G06T 5/00* (2006.01)

(52) U.S. Cl.
CPC ...................................... *G06T 5/006* (2013.01)

(58) Field of Classification Search
None
See application file for complete search history.

(56) References Cited

U.S. PATENT DOCUMENTS

| | | | |
|---|---|---|---|
| 8,285,077 B2* | 10/2012 | Fero et al. | 382/290 |
| 8,320,665 B2* | 11/2012 | Puneet et al. | 382/164 |
| 8,897,600 B1* | 11/2014 | Ma et al. | 382/290 |
| 2010/0073735 A1* | 3/2010 | Hunt et al. | 358/462 |
| 2010/0208996 A1* | 8/2010 | Noonan et al. | 382/177 |

* cited by examiner

*Primary Examiner* — Hadi Akhavannik
(74) *Attorney, Agent, or Firm* — Dergosits & Noah LLP; Todd A. Noah

(57) ABSTRACT

Auto-correcting perspective distortion in document images is described. Line segments are identified in a distorted document image. Line segments are combined to form candidate lines. Candidate lines are grouped into a substantially horizontal group of lines and a substantially vertical group of lines. Linear equations are calculated to fit the substantially horizontal group of lines. Linear equations are calculated to fit the substantially vertical group of lines. The distorted document image is transformed based on two linear equations associated with two substantially horizontal lines and two linear equations associated with two substantially vertical lines.

17 Claims, 9 Drawing Sheets

METHOD AND SYSTEM FOR AUTO-CORRECTING PERSPECTIVE DISTORTION IN DOCUMENT IMAGES

BACKGROUND

A document scanner user can create a digital document image by processing an original document parallel to the lens of the document scanner, thereby avoiding any perspective distortion in the document image. A mobile phone user can also create a digital document image using a digital camera incorporated into the mobile phone, but perspective distortion may be created in the document image if the original document is not perfectly parallel to the digital camera lens. For example, if a user takes a digital camera photograph of a paycheck to be electronically deposited in the user's bank account, the user may position the lens of their mobile phone's digital camera such that the lens is not perfectly parallel to the paycheck, thereby creating a perspective distortion in the image of the paycheck despite the user's best efforts to avoid creating such a distortion. Image perspective correction tools can correct some perspective distortions in document images, but user requirements may make using such tools burdensome. For example, an image perspective correction tool may require a user to participate in a time-consuming procedure that identifies all of the corners of a document image in order to correct the perspective distortion. In another example, an image perspective correction tool may require a user to photograph an original document superimposed over a dark background so that the image perspective tool can more easily identify all of the corners of the document image in order to correct the perspective distortion. Furthermore, such image perspective correction tools may experience difficulties when the background of the original document is not sufficiently dark, when the original document has folded or torn corners, when protruding documents beneath the original document make identification of the original document's corners more difficult, and when notes are attached to the original document.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIG. 3 illustrates an example of a distorted document image, under an embodiment;

FIG. 4 illustrates an example of short line segments in a distorted document, under an embodiment;

FIG. 8 illustrates an example of a transformation applied to a distorted document, under an embodiment.

DETAILED DESCRIPTION

Embodiments herein enable auto-correcting perspective distortion in document images. Line segments are identified in a distorted document image. For example, an image perspective correction tool identifies numerous short line segments in the distorted image of an invoice. Line segments are combined to form candidate lines. For example, the image perspective correction tool combines many of the short line segments that are collinear to form lines that are candidates for transforming the distorted image. Candidate lines are grouped into a substantially horizontal group of lines and a substantially vertical group of lines. For example, the image perspective correction tool identifies one group of substantially vertical lines and another group of substantially horizontal lines, discarding candidate lines that are too short and candidate lines with angles that differ too much from the angles of other candidate lines in their prospective group. Linear equations are calculated to fit the substantially horizontal group of lines, and linear equations are calculated to fit the substantially vertical group of lines. For example, the image perspective correction tool processes the substantially vertical group of lines and the substantially horizontal group of lines separately to create a grid of substantially vertical lines and substantially horizontal lines based on linear equations that fit the groups of lines. The distorted document image is transformed based on two linear equations associated with two substantially horizontal lines and two linear equations associated with two substantially vertical lines. For example, the image perspective correction tool transforms the distorted image based on the linear equations that fit the groups of lines. The image perspective correction tool automatically corrects distorted document images without placing a burden on the user who created the distorted document image.

Figure 1:
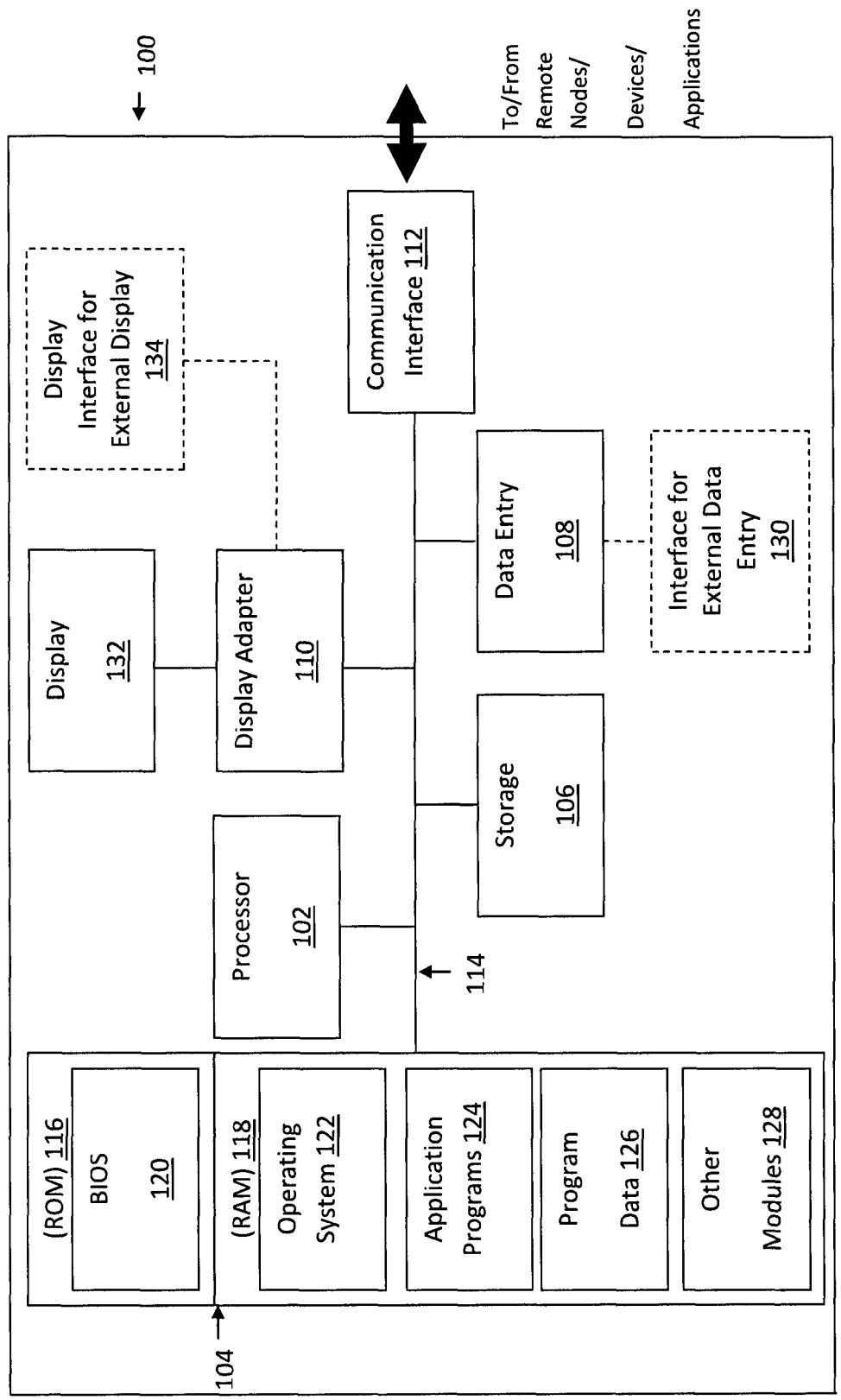
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for auto-correcting perspective distortion in document images.

Figure 2:
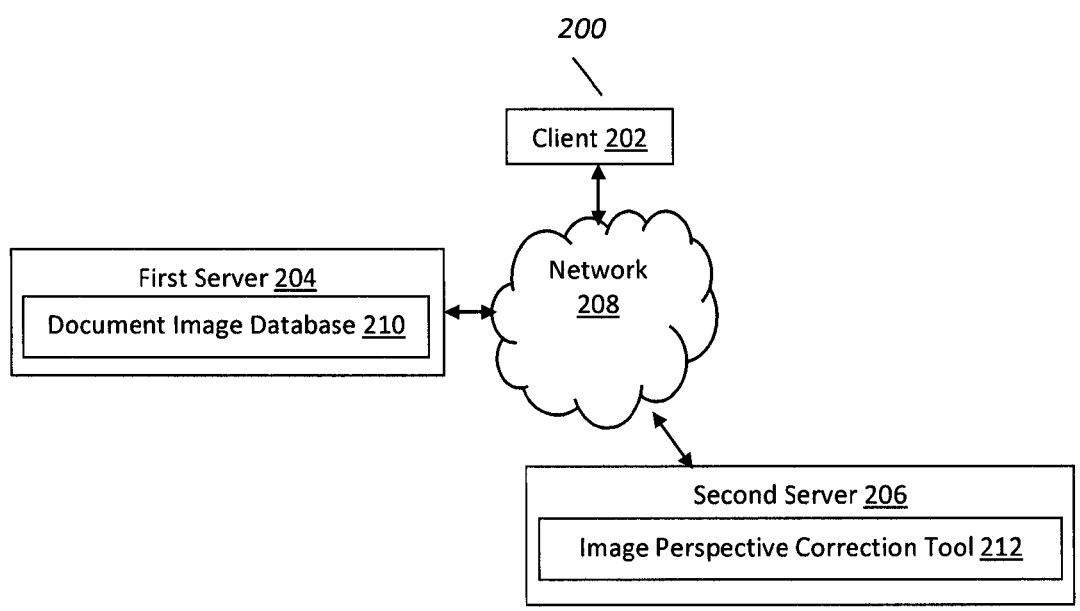
FIG. 2 illustrates a block diagram of an example system for auto-correcting perspective distortion in document images, under an embodiment.

FIG. 2 illustrates a block diagram of a system that implements auto-correcting perspective distortion in document images, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202; and a first server 204 and a second server 206 that are provided by a hosting company. The client 202 and the servers 204-206 communicate via a network 208. An enterprise uses the client 202 to access document images via the servers 204-206. The first server 204 includes a document image database 210. The second server 206 includes an image perspective correction tool 212. The second server 206 executes the image perspective correction tool 212 to retrieve distorted document images from the document image database 210, correct the perspective distortions of the distorted document images, and store the corrected document images in the document image database 210. Although FIG. 2 depicts the document image database 210 residing in the first server 204 and the image perspective correction tool 212 residing in the second server 206, any portion of the document image database 210 may reside in the client 202, the second server 206, or other computers not depicted in FIG. 2, and any portion of the image perspective correction tool 212 may reside in the client 202, the first server 204, or other computers not depicted in FIG. 2. Although FIG. 2 depicts the system 200 with one client 202, two servers 204-206, one network 208, one document image database 210, and one image perspective correction tool 212, the system 200 may include any number of clients 202, servers 204-206, networks 208, document image databases 210, and image perspective correction tools 212. The client 202 and the servers 204-206 may each be substantially similar to the system 100 depicted in FIG. 1.

Figure 3:
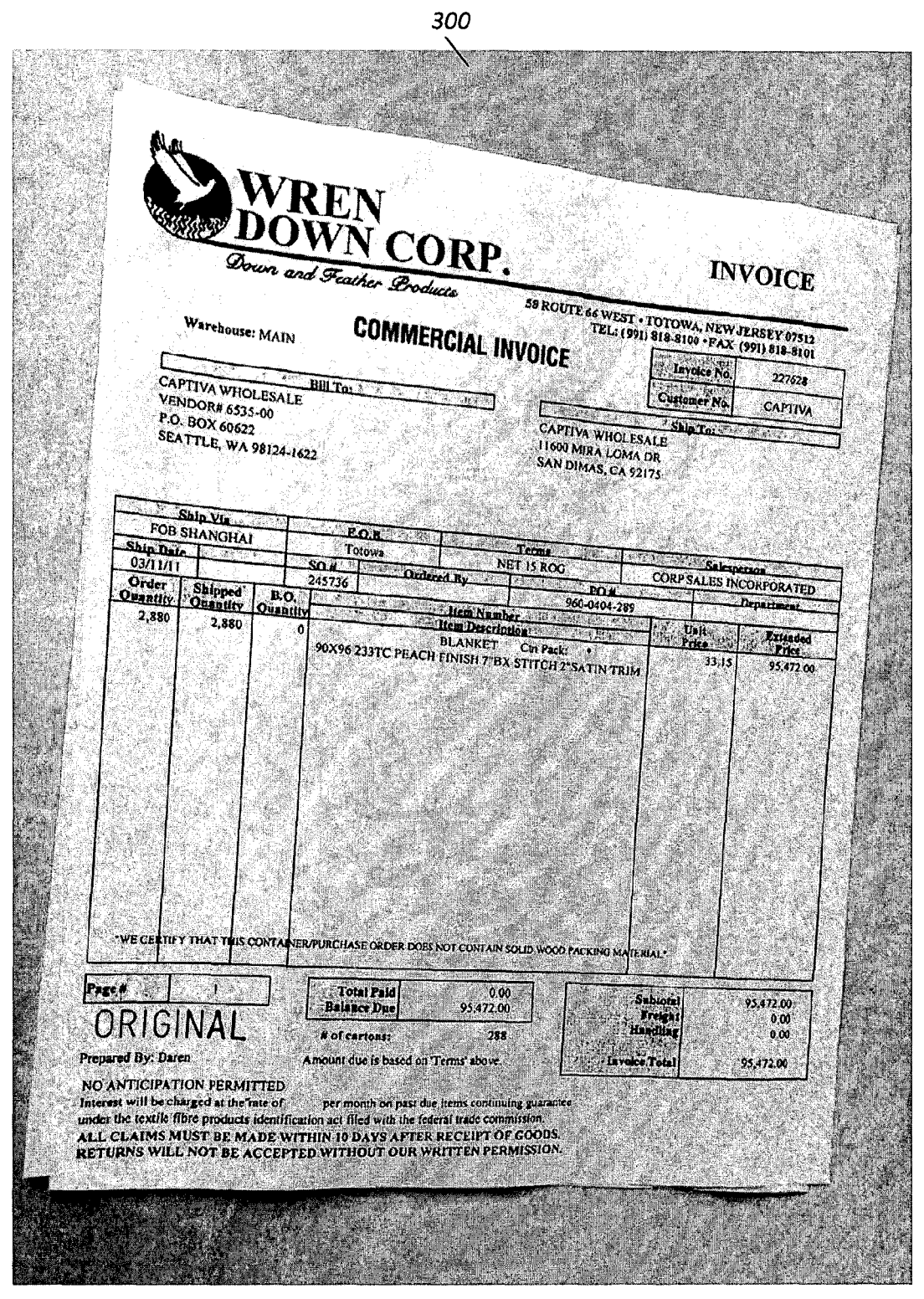

FIG. 3 illustrates an example of a distorted document image, under an embodiment. The image perspective correction tool 212 begins by retrieving a distorted document image 300, possibly from the document image databases 210.

Figure 4:
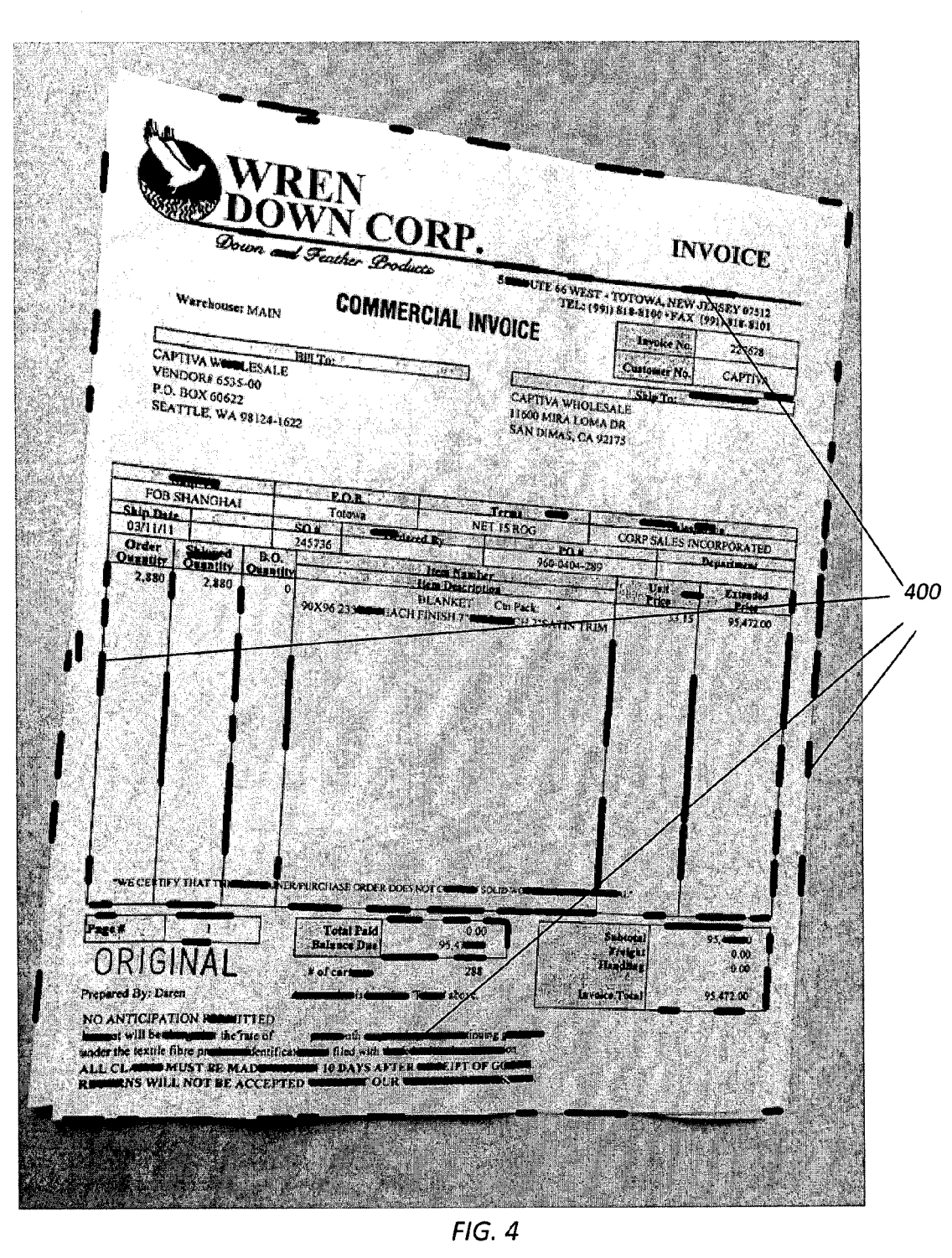

FIG. 4 illustrates an example of short line segments in a distorted document, under an embodiment. The image perspective correction tool 212 identifies numerous short line segments 400 in the distorted image of an invoice. The short line segments 400 depicted by thick black lines are just a small sample of the short line segments identified in the distorted image of the invoice. The image perspective correction tool 212 may identify numerous short line segments 400 in the distorted image of the invoice through executing the following sequence, which enhances "true" edges in the distorted image while removing fine details and noise. The image perspective correction tool 212 may create a grayscale image of the distorted document image to prepare the distorted image for use by subsequent algorithms that are designed to process grayscale images. The image perspective correction tool 212 may apply a blur algorithm, such as a Gaussian blur algorithm, to the grayscale image to remove the effects of noise in the grayscale image. The blur algorithm may also remove fine details in the grayscale image, such as fine lines in a driver's license that are intended to make photocopying of the driver's license difficult. The image perspective correction tool 212 may apply an edge detector algorithm, such as a Canny edge detector algorithm, to the grayscale image to identify edges, not necessarily lines, in the grayscale image. For textured backgrounds, such as licenses or certificates, the edge detector algorithm produces a large number of small edges. The image perspective correction tool 212 may dilate the identified edges to merge together nearby small edges to form dilated line segments. The image perspective correction tool 212 may apply a skeleton transform to the dilated line segments to thin the dilated line segments to potential line segments. The image perspective correction tool 212 may apply a transform algorithm, such as a Hough transform, to the potential line segments to identify the line segments 400, through the detection of straight line segments.

Figure 5:
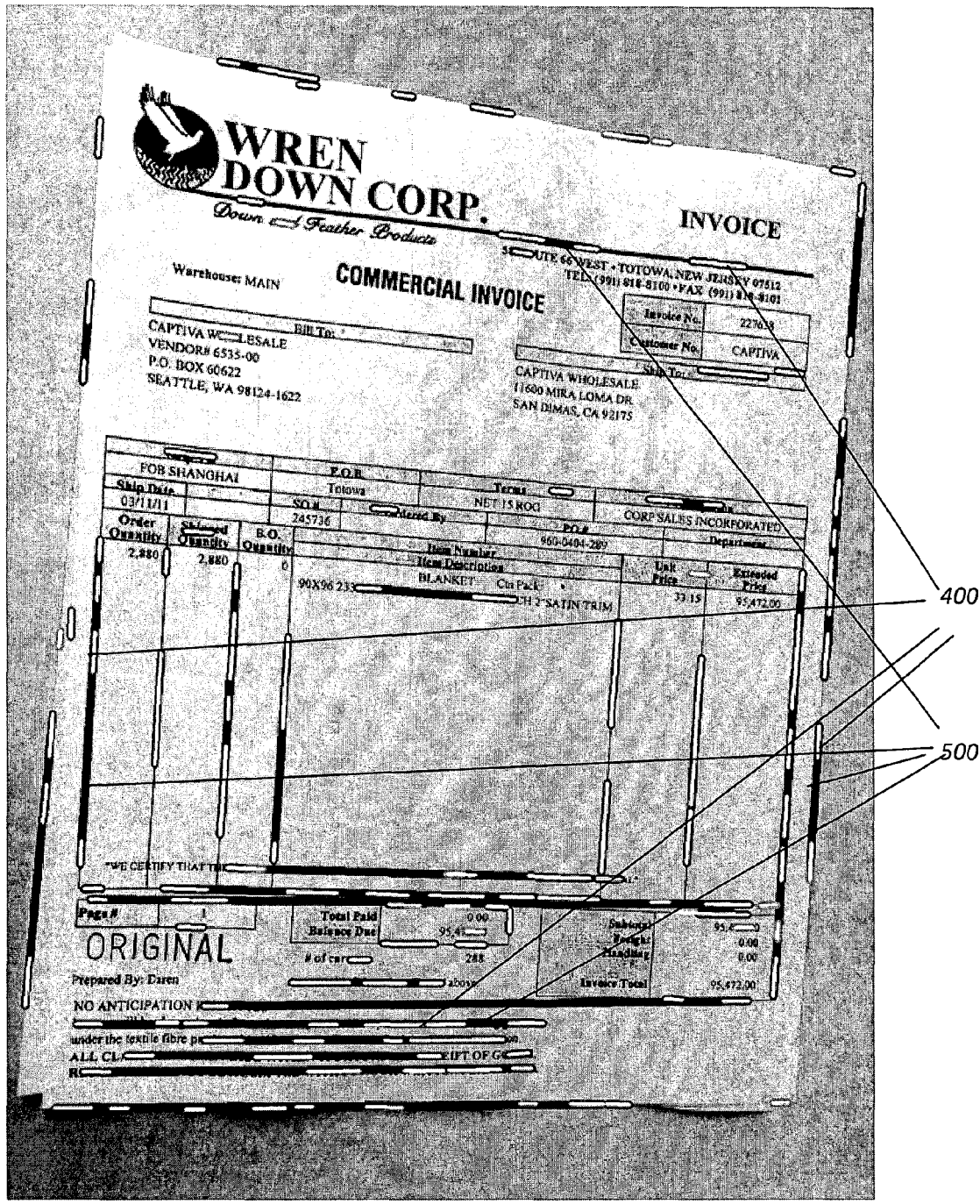
FIG. 5 illustrates an example of candidate lines in a distorted document, under an embodiment.

FIG. 5 illustrates an example of candidate lines in a distorted document, under an embodiment. The image perspective correction tool 212 combines short line segments, which are substantially collinear, to form lines 500 that are candidates for transforming the distorted image. The candidate lines 500 are depicted as thick black lines, while the short line segments 400 are depicted as thick white lines. Line segments are substantially collinear if they have the approximately same angle and intercept. A "horizontal" line can be expressed as: $y=x \tan \theta + b$ where $\theta$ is the angle of the line to the horizontal axis and $b$ is the intercept to the vertical axis. A "vertical" line can be expressed as $x=y \tan \theta + b$, where $\theta$ is the angle to the vertical axis and $b$ is the intercept to the horizontal axis. The combination process does not depend specifically on this way of grouping short line segments into candidate lines, as the important thing is that nearly-collinear segments are grouped together. The angle and intercept of a candidate line is the average of the angle and intercept of all of its short line segments weighted by the length of those short line segments. For example, if a candidate line contains a very long line segment and a very short line segment, the angle and intercept of the candidate line will be close to the angle and intercept of the very long line segment. This weighting helps prevent small errors in measuring short line segments from adversely affecting the calculations for the candidate lines. The combination process needs a slope and an intercept for the candidate line, but this precise definition is not required.

Figure 6:
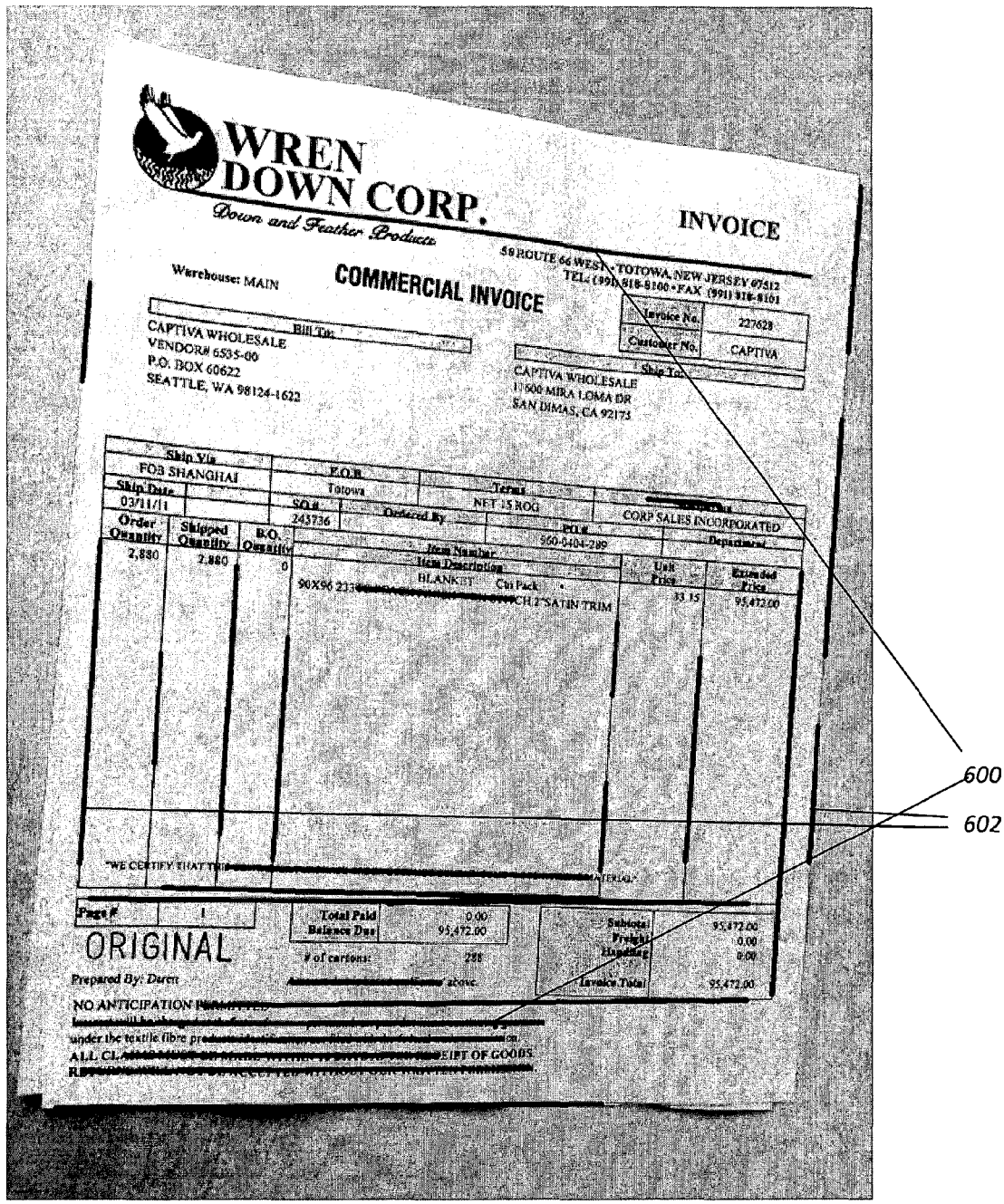
FIG. 6 illustrates an example of a substantially horizontal group of lines and a substantially vertical group of lines in a distorted document, under an embodiment.

FIG. 6 illustrates an example of a substantially horizontal group of lines and a substantially vertical group of lines in a distorted document, under an embodiment. The image perspective correction tool 212 groups candidate lines into a substantially horizontal group of lines 600 and a substantially vertical group of lines 602, with the lines 600 and 602 depicted as thick black lines. The image perspective correction tool 212 may discard candidate lines that are too short and candidate lines with angles that differ too much from the angles of other candidate lines in their prospective group. "Horizontal" lines are those where the angle to the horizontal is between negative 45° and positive 45°; while "vertical" lines are those where the angle to the horizontal is between positive 45° and positive 135°. After discarding the candidate lines that are too short and the candidate lines with angles that differ too much from the angles of other candidate lines in their prospective group, the prospective group of candidate lines may contain fewer than two candidate lines, or the candidate lines in the group may be too close together, such as if all of candidate lines in the "horizontal" group are all in the top 10% of the distorted image. In either of these situations, the image perspective correction tool 212 discards the prospective group and applies no correction to the distorted image. The lines 600 and 602 are substantially the same as the candidate lines 500 in FIG. 5, but notably missing is the vertical black line at the lower left edge of the paper. In this case, the missing candidate line was not from the top document, but from a slightly misaligned document beneath it. The image perspective correction tool 212 rejected this candidate line because its angle is inconsistent with the rest of the angles for the lines 600 and 602.

Figure 7:
FIG. 7 illustrates an example of a grid of substantially vertical lines and substantially horizontal lines for a distorted document, under an embodiment.

FIG. 7 illustrates an example of a grid of substantially vertical lines and substantially horizontal lines for a distorted document, under an embodiment. The image perspective correction tool 212 processes the substantially vertical group of lines and the substantially horizontal group of lines separately to create a grid 700 of substantially vertical lines and substantially horizontal lines based on linear equations calculated to fit the groups of lines. The image perspective correction tool 212 calculates equations to fit the substantially horizontal group of lines to a model of their angle as a function of their position on the page, and calculates equations to fit the substantially horizontal group of lines to a model of their angle as a function of their position on the page. The image perspective correction tool 212 typically uses linear equations, but the image perspective correction tool 212 may use a warped grid, such as SAMPLE order to produce more-precise corrections than produced with a linear model. The grid 700 is depicted as thick white lines. The straight lines in the distorted image are generally consistent with the substantially vertical lines and substantially horizontal lines in the grid 700. Each "horizontal" line that fits the grid 700 is expressed by the angle $\theta_i$ and the intercept $b_i$. A linear equation for the angle as a function of intercept is found by fitting these ($\theta_i$,$b_i$) pairs to a line of the form $\theta = r b + s$ using a linear least squares fit. If the horizontal lines were perfectly aligned, the equation would be $\theta = 0$. If the distorted image was rotated with no perspective error, the equation would be $\theta = s$, where s is the angle of rotation. If the distorted image was a trapezoid, the equation would be $\theta = r b + s$, where $\theta < 0$ at the top of the distorted image and $\theta > 0$ at the bottom of the distorted image.

Figure 8:
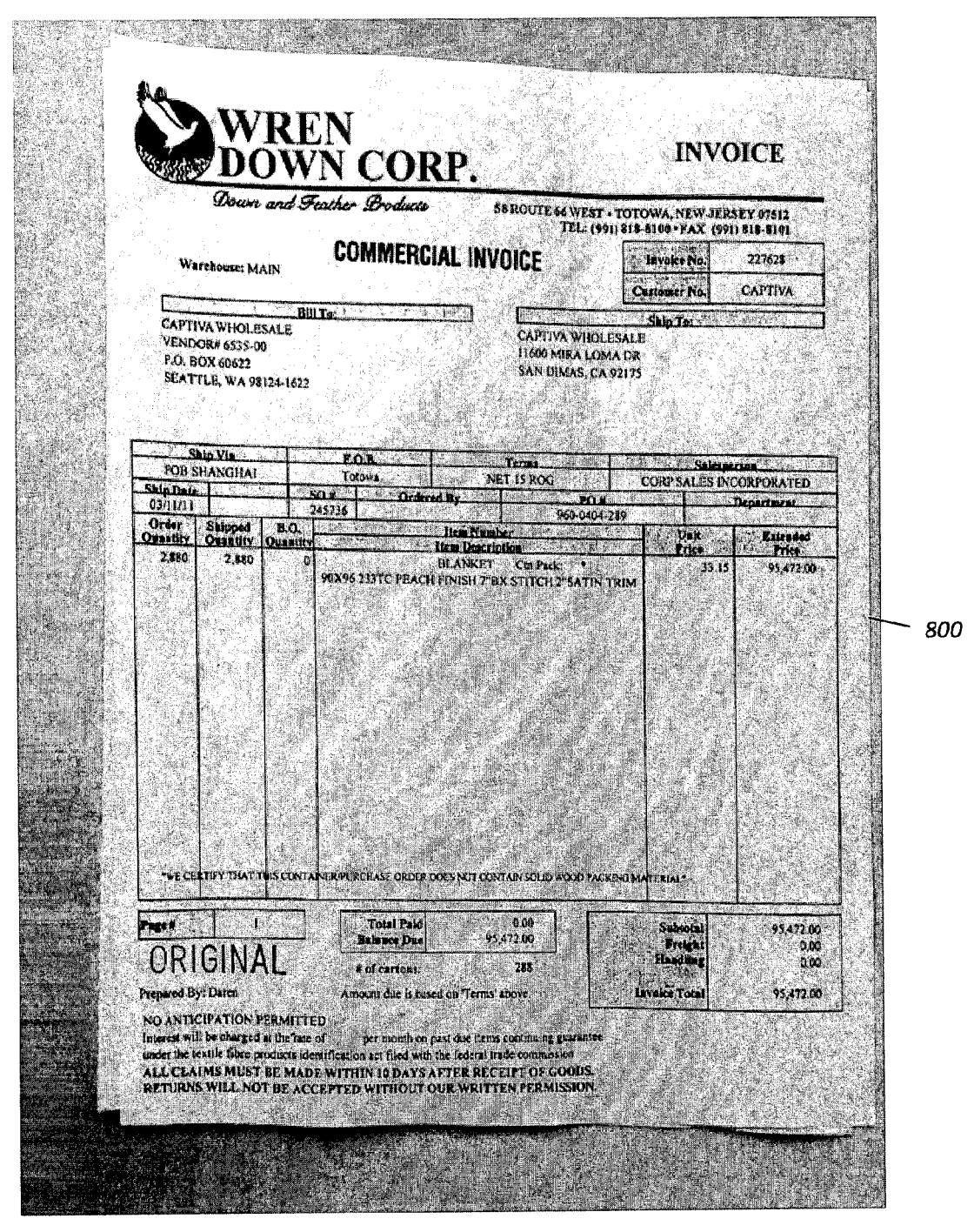

FIG. 8 illustrates an example of a transformation applied to a distorted document, under an embodiment. The image perspective correction tool 212 creates a transformed image 800 based on the linear equations that fit the groups of substantially horizontal lines and substantially vertical lines. The image perspective correction tool 212 creates the transformed image 800 so that the grid 700 in FIG. 7 consists of purely vertical and horizontal lines. Since the linear equations define the grid 700 across the entire distorted image, the image perspective correction tool 212 selects two horizontal and two vertical lines in the grid 700 to define the transformed image 800. The image perspective correction tool 212 selects the horizontal line passing through the point (0,0), the horizontal line passing through the point (0, height), the vertical line passing through the point (0,0) and the vertical line passing through the point (width, 0). The image perspective correction tool 212 finds the intersection of each of these lines to determine the point $(x_{0,0},y_{0,0})$ which will be mapped to (0,0), the point $(x_{w,0},y_{w,0})$ which will be mapped to (width,0) and so on. The image perspective correction tool 212 corrects perspective distortion by searching for straight lines in the distorted image under the generally-valid presumption that the document images often have lines, and that these lines are vertical and horizontal. The short line segments may be based on document text, an edge of the distorted document image, and/or a barcode. Text, edges, and barcodes may serve as alternate sources of line segments, as virtual "lines" in the image, such as the baseline of a row of text, the straight margin in a block of text, or the baseline of a barcode, rather than lines in the traditional sense of a linear set of black pixels.

For example, document text in columns may be identified as short vertical line segments, while a bar code at the bottom of a page may be identified as a short horizontal line segment. Diagonal lines are uncommon in documents, although the rejection mechanisms incorporated in the image perspective correction tool 212 will protect against using diagonal lines for transforming a distorted image. The image perspective correction tool 212 transforms the distorted image so that the grid 700 consists of purely vertical and horizontal lines. In the transformed image 800, the page is much more "square" to the image than the distorted image 300. The image perspective correction tool 212 automatically corrects distorted document images without placing a burden on the user who created the distorted document image.

Figure 9:
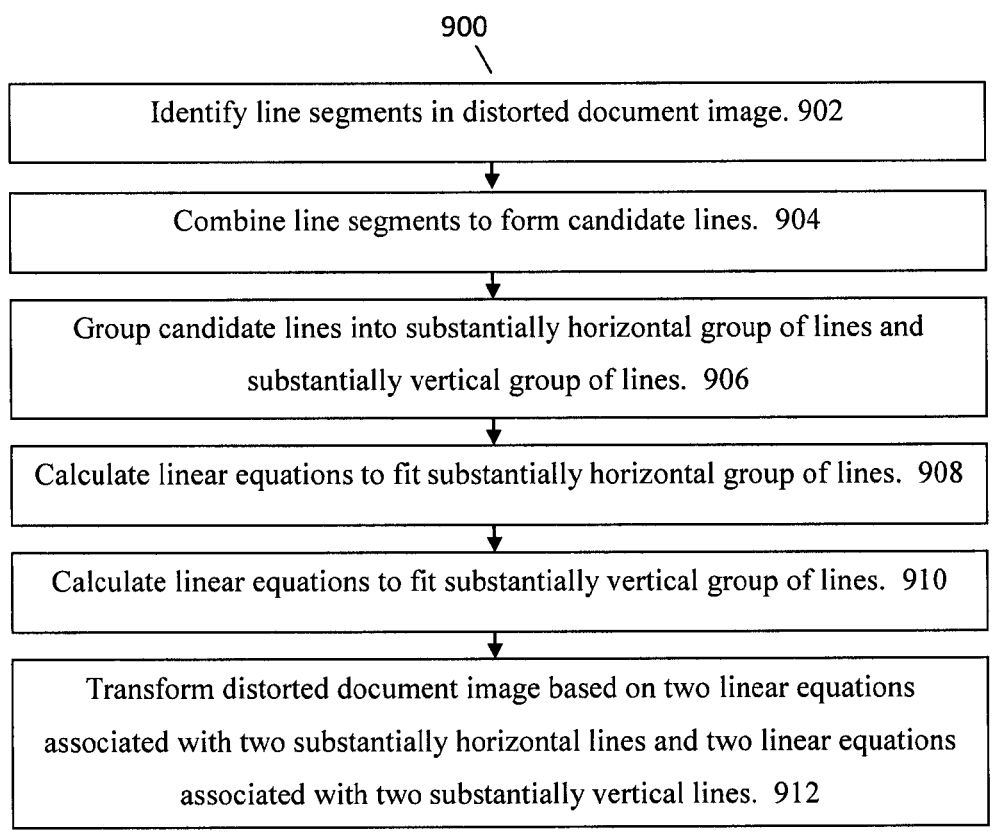
FIG. 9 illustrates a flowchart for auto-correcting perspective distortion in document images, under an embodiment.

FIG. 9 illustrates a flowchart for auto-correcting perspective distortion in document images, under an embodiment. The image perspective correction tool 212 may execute the flowchart 900 to automatically correct any perspective distortions in document images.

Line segments are identified in a distorted document image, act 902. For example, the image perspective correction tool 212 identifies numerous short line segments 400 in the distorted image 300 of the invoice.

Line segments are combined to form candidate lines, act 904. For example, the image perspective correction tool 212 combines short line segments 400 that are collinear to form lines 500 that are candidates for transforming the distorted image 300.

Candidate lines are grouped into a substantially horizontal group of lines and a substantially vertical group of lines, act 906. For example, the image perspective correction tool 212 identifies one group of substantially vertical lines 602 and another group of substantially horizontal lines 600, discarding candidate lines that are too short and candidate lines with angles that differ too much from the angles of other candidate lines in their prospective group.

Linear equations are calculated to fit substantially horizontal group of lines, act 908. For example, the image perspective correction tool 212 processes the substantially horizontal group of lines to create the grid 700 of substantially horizontal lines based on linear equations that fit the substantially horizontal group of lines.

Linear equations are calculated to fit substantially vertical group of lines, act 910. For example, the image perspective correction tool 212 processes the substantially vertical group of lines to create the grid 700 of substantially vertical lines based on linear equations that fit the substantially vertical group of lines.

A distorted document image is transformed based on two linear equations associated with two substantially horizontal lines and two linear equations associated with two substantially vertical lines, act 912. For example, the image perspective correction tool 212 creates the transformed image 800 based on the linear equations that fit the groups of lines.

Although FIG. 9 depicts the acts 902-912 occurring in a specific order, the acts 902-912 may occur in another order. Embodiments herein enable auto-correcting perspective distortion in document images. The image perspective correction tool automatically corrects distorted document images without placing a burden on the user who created the distorted document image.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for auto-correcting perspective distortion in document images, the system comprising:
a processor-based application, which when executed on a computer, will cause the processor to:
   identify a plurality of line segments in a distorted document image;
   combine a second plurality of line segments to form a plurality of candidate lines;
   group a second plurality of candidate lines into a substantially horizontal group of lines;
   group a third plurality of candidate lines into a substantially vertical group of lines;
   calculate a first plurality of linear equations to fit the substantially horizontal group of lines;
   calculate a second plurality of linear equations to fit the substantially vertical group of lines; and
   transform the distorted document image based on a first two linear equations of the first plurality of linear equations associated with two substantially horizontal lines comprising a lowest substantially horizontal line and a highest substantially horizontal line of the substantially horizontal group of lines and a second two linear equations of the second plurality of linear equations associated with two substantially vertical lines comprising a leftmost substantially vertical line and a rightmost substantially vertical line of the substantially vertical group of lines.

2. The system of claim 1, wherein identifying the plurality of line segments in the distorted document image comprises:
   creating a grayscale image of the distorted document image;
   applying a blur algorithm to the grayscale image to remove the effects of noise in the grayscale image;
   applying an edge detector algorithm to the grayscale image to identify a plurality of edges in the grayscale image;
   dilating the plurality of edges to merge together edges within a proximity threshold to form a plurality of dilated line segments;
   applying a skeleton transform to the plurality of dilated line segments to thin the plurality of dilated line segments to a plurality of potential line segments; and
   applying a probabilistic transform algorithm to the plurality of potential line segments to identify the plurality of line segments.

3. The system of claim 1, wherein the plurality of line segments is based on at least one of document text, an edge of the distorted document image, and a barcode.

4. The system of claim 1, wherein combining the second plurality of line segments to form the plurality of candidate lines comprises combining a plurality of line segments that are substantially collinear to form a candidate line, and wherein an angle and an intercept associated with the candidate line is based on a weighted average of angles and intercepts associated with each of the plurality of line segments that are substantially collinear.

5. The system of claim 1, wherein grouping the second plurality of candidate lines into the substantially horizontal group of lines comprises:
   grouping the second plurality of candidate lines associated with an angle between negative 45 degrees to a horizon and positive 45 degrees to the horizon; and
   discarding a candidate line based on at least one of determining that farthest apart points in a candidate line are less apart than a distance threshold and determining that an angle associated with the candidate line differs from an average angle associated with the second plurality of the candidate lines by more than an angle threshold.

6. The system of claim 1, wherein grouping the third plurality of candidate lines into the substantially vertical group of lines comprises:
   grouping the third plurality of candidate lines associated with an angle between positive 45 degrees to a horizon and positive 135 degrees to the horizon; and discarding a candidate line based on at least one of determining that farthest apart points in a candidate line are less apart than a distance threshold and determining that an angle associated with the candidate line differs from an average angle associated with the third plurality of the candidate lines by more than an angle threshold.

7. A computer-implemented method for auto-correcting perspective distortion in document images, the method comprising:
- identifying a plurality of line segments in a distorted document image;
- combining a second plurality of line segments to form a plurality of candidate lines;
- grouping a second plurality of candidate lines into a substantially horizontal group of lines;
- grouping a third plurality of candidate lines into a substantially vertical group of lines;
- calculating a first plurality of linear equations to fit the substantially horizontal group of lines;
- calculating a second plurality of linear equations to fit the substantially vertical group of lines; and
- transforming the distorted document image based on a first two linear equations of the first plurality of linear equations associated with two substantially horizontal lines comprising a lowest substantially horizontal line and a highest substantially horizontal line of the substantially horizontal group of lines and a second two linear equations of the second plurality of linear equations associated with two substantially vertical lines comprising a leftmost substantially vertical line and a rightmost substantially vertical line of the substantially vertical group of lines.

8. The computer-implemented method of claim 7, wherein identifying the plurality of line segments in the distorted document image comprises:
- creating a grayscale image of the distorted document image;
- applying a blur algorithm to the grayscale image to remove the effects of noise in the grayscale image;
- applying an edge detector algorithm to the grayscale image to identify a plurality of edges in the grayscale image;
- dilating the plurality of edges to merge together edges within a proximity threshold to form a plurality of dilated line segments;
- applying a skeleton transform to the plurality of dilated line segments to thin the plurality of dilated line segments to a plurality of potential line segments; and
- applying a probabilistic transform algorithm to the plurality of potential line segments to identify the plurality of line segments.

9. The computer-implemented method of claim 7, wherein the plurality of line segments is based on at least one of document text, an edge of the distorted document image, and a barcode.

10. The computer-implemented method of claim 7, wherein combining the second plurality of line segments to form the plurality of candidate lines comprises combining a plurality of line segments that are substantially collinear to form a candidate line, and wherein an angle and an intercept associate with the candidate line is based on a weighted average of angles and intercepts associated with each of the plurality of line segments that are substantially collinear.

11. The computer-implemented method of claim 7, wherein grouping the second plurality of candidate lines into the substantially horizontal group of lines comprises:
- grouping the second plurality of candidate lines associated with an angle between negative 45 degrees to a horizon and positive 45 degrees to the horizon; and
- discarding a candidate line based on at least one of determining that farthest apart points in a candidate line are less apart than a distance threshold and determining that an angle associated with the candidate line differs from an average angle associated with the second plurality of the candidate lines by more than an angle threshold.

12. The computer-implemented method of claim 7, wherein grouping the third plurality of candidate lines into the substantially vertical group of lines comprises:
- grouping the third plurality of candidate lines associated with an angle between positive 45 degrees to a horizon and positive 135 degrees to the horizon; and
- discarding a candidate line based on at least one of determining that farthest apart points in a candidate line are less apart than a distance threshold and determining that an angle associated with the candidate line differs from an average angle associated with the third plurality of the candidate lines by more than an angle threshold.

13. A computer program product, comprising computer-readable program code to be executed by one or more processors when retrieved from a non-transitory computer-readable medium, the computer-readable program code including instructions to:
- identify a plurality of line segments in a distorted document image;
- combine a second plurality of line segments to form a plurality of candidate lines;
- group a plurality of candidate lines into a substantially horizontal group of lines;
- group a second plurality of candidate lines into a substantially vertical group of lines;
- calculate a first plurality of linear equations to fit the substantially horizontal group of lines;
- calculate a second plurality of linear equations to fit the substantially vertical group of lines; and
- transform the distorted document image based on a first two linear equations of the first plurality of linear equations associated with two substantially horizontal lines comprising a lowest substantially horizontal line and a highest substantially horizontal line of the substantially horizontal group of lines and a second two linear equations of the second plurality of linear equations associated with two substantially vertical lines comprising a leftmost substantially vertical line and a rightmost substantially vertical line of the substantially vertical group of lines.

14. The computer program product of claim 13, wherein identifying the plurality of line segments in the distorted document image comprises:
- creating a grayscale image of the distorted document image;
- applying a blur algorithm to the grayscale image to remove the effects of noise in the grayscale image;
- applying an edge detector algorithm to the grayscale image to identify a plurality of edges in the grayscale image;
- dilating the plurality of edges to merge together edges within a proximity threshold to form a plurality of dilated line segments;
- applying a skeleton transform to the plurality of dilated line segments to thin the plurality of dilated line segments to a plurality of potential line segments; and
- applying a probabilistic transform algorithm to the plurality of potential line segments to identify the plurality of line segments.

15. The computer program product of claim 14, wherein the plurality of line segments is based on at least one of document text, an edge of the distorted document image, and a barcode.

16. The computer program product of claim 13, wherein combining the second plurality of line segments to form the plurality of candidate lines comprises combining a plurality of line segments that are substantially collinear to form a candidate line, and wherein an angle and an intercept associate with the candidate line is based on a weighted average of angles and intercepts associated with each of the plurality of line segments that are substantially collinear.

17. The computer program product of claim 13, wherein grouping the second plurality of candidate lines into the substantially horizontal group of lines comprises:
   grouping the second plurality of candidate lines associated with an angle between negative 45 degrees to a horizon and positive 45 degrees to the horizon; and
   discarding a candidate line based on at least one of determining that farthest apart points in a candidate line are less apart than a distance threshold and determining that an angle associated with the candidate line differs from an average angle associated with the second plurality of the candidate lines by more than an angle threshold; and
wherein grouping the third plurality of candidate lines into the substantially vertical group of lines comprises:
   grouping the third plurality of candidate lines associated with an angle between positive 45 degrees to a horizon and positive 135 degrees to the horizon; and
   discarding a candidate line based on at least one of determining that farthest apart points in a candidate line are less apart than a distance threshold and determining that an angle associated with the candidate line differs from an average angle associated with the third plurality of the candidate lines by more than an angle threshold.

\* \* \* \* \*